April 1, 1958  E. J. VIGUERS ET AL  2,828,846
SYSTEM FOR CONTROL OF ELECTROMAGNETICALLY
ENERGIZED BRAKES AND CLUTCHES
Filed April 29, 1955
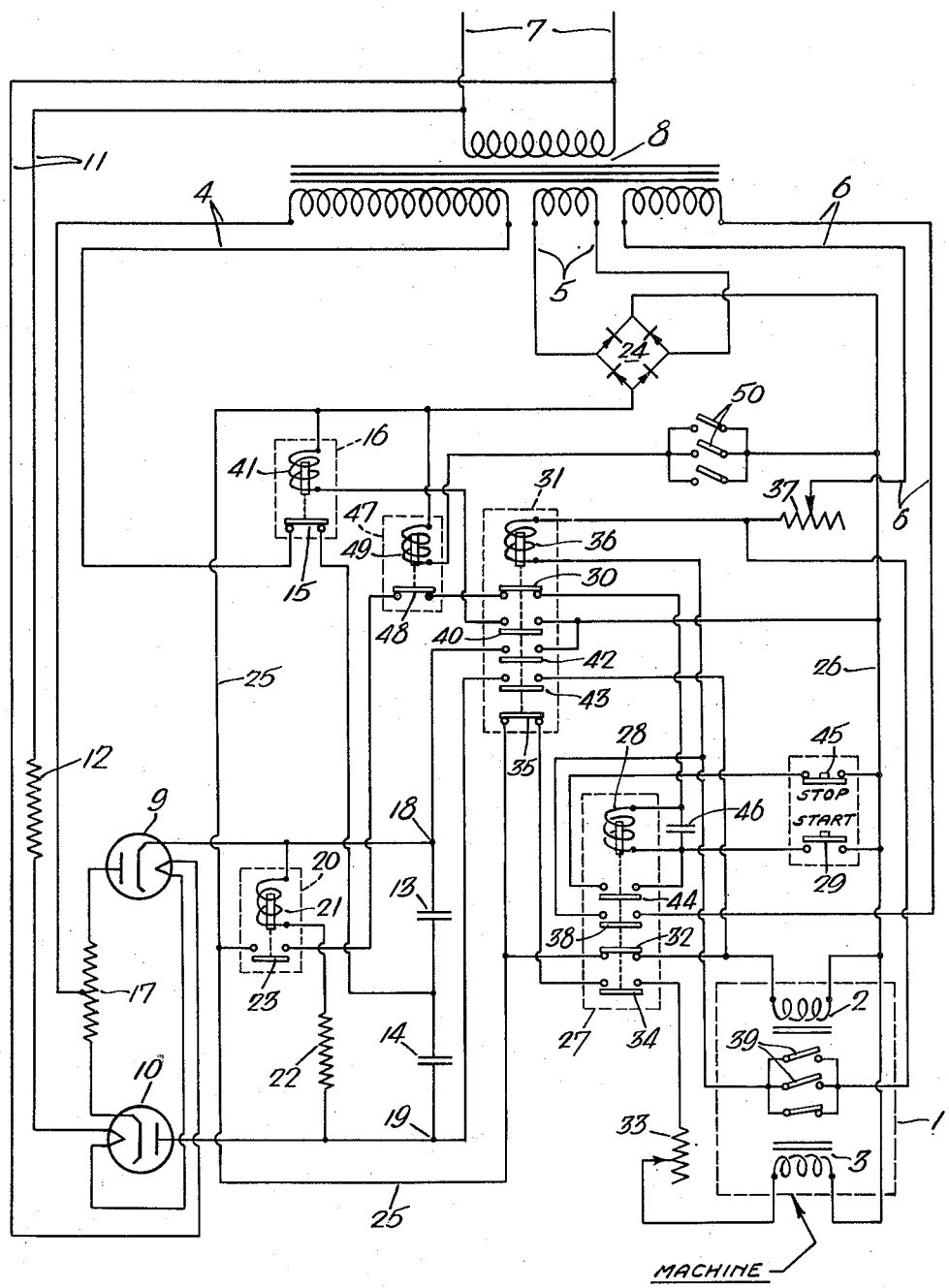
Inventors:
Ernest J. Viguers
Robert S. Work
by Howson & Howson Attys.

United States Patent Office 2,828,846
Patented Apr. 1, 1958

2,828,846

SYSTEM FOR CONTROL OF ELECTROMAGNETICALLY ENERGIZED BRAKES AND CLUTCHES

Ernest J. Viguers, Folsom, and Robert S. Work, Kennett Square, Pa., assignors to Lansdowne Steel & Iron Company, Morton, Pa., a corporation of Pennsylvania Application April 29, 1955, Serial No. 504,991

7 Claims. (Cl. 192—129)

This invention relates to control systems for electromagnetically operated brakes and electromagnetically operated clutches used on machines such as looms.

In the operation of a machine equipped with an electromagnetic brake and an electromagnetic clutch, starting of the machine is effected by simultaneous deenergization of the brake and energization of the clutch, and stopping of the machine is effected by simultaneous deenergization of the clutch and energization of the brake. A known method of effecting quick stoppage of such a machine is by discharging stored energy from one or more capacitors into the winding of the brake to cause quick build-up of the magnetic flux in the brake magnet. However, frequent discharge of the capacitor shortens its life, as each discharge constitutes a severe shock to the capacitor. In many instances, such quick stoppage is not necessary except under emergency conditions, and the discharge of the capacitor on every stoppage of the machine needlessly shortens the life of the capacitor. This results in inconvenience and expense incident to replacement of the capacitor.

One object of the present invention is to overcome the above-mentioned objection.

Another object of the invention is to provide a control system wherein normal stoppages are performed without discharge of stored energy but such energy is available and is utilized whenever quick stoppage is essential.

In accordance with the invention, a system is provided by which the brake and clutch of a machine are selectively energized from a low D.-C. voltage supply circuit during normal operation of the machine, and quick stoppage of the machine is effected, in response to an emergency condition, by discharging stored energy at high voltage into the brake winding and then applying the low D.-C. voltage to maintain the built up magnetic flux of the brake.

The invention may be fully understood from the following detailed description with reference to the accompanying drawing in which the single figure is a diagrammatic illustration of a preferred form of the control system provided by this invention.

Referring more particularly to the drawing, the dot and dash rectangle 1 represents a machine, such as a loom, equipped with an electromagnetically energized brake represented by the winding and electromagnetic core 2, and also equipped with an electromagnetically energized clutch represented by the winding and electromagnetic core 3. The present invention is not concerned with the brake or the clutch per se, which may be of conventional form, but only with the control of energization and deenergization of the respective windings of the brake and clutch.

For the purposes presently to be described, three A.-C. voltage supply circuits 4, 5 and 6 are provided, and these circuits are preferably supplied from a common input circuit 7 (e. g. a conventional 115 volt A. C. supply line) through a transformer 8 having three secondary windings.

The A.-C. voltage of circuit 4 is relatively high, e. g. 345 volts. The A.-C. voltage of circuit 5 is relatively low, e. g. 12 volts. The A.-C. voltage of circuit 6 is also relatively low, e. g. 22 volts.

Circuit 4 is connected to a conventional full-wave rectifier arrangement comprising rectifier tubes 9 and 10 whose heater elements are serially connected in a heater circuit 11 through a current limiting resistor 12, circuit 11 being connected to the main supply circuit 7. Capacitors 13 and 14 are connected to the tubes 9 and 10 as shown, and the junction of the capacitors is connected to one side of circuit 4 through normally closed contact 15 of a relay 16 whose purpose is to interrupt the charging circuit for the capacitors during discharge of the latter as hereinafter described. In operation of the rectifying arrangement, current flows through resistor 17 and tubes 9 and 10 to charge the capacitors 13 and 14. The direction of charging current through the capacitors is such that the unidirectional voltages established across the capacitors are in series aiding relation between points 18 and 19. As described hereinafter, during automatic quick stoppage, the energy stored in both of the capacitors is discharged into the winding of the electromagnetic brake 2.

For a purpose which will appear later, a sensitive relay 20 has its coil 21 connected across points 18 and 19 through a resistor 22. Whenever the capacitors 13 and 14 are charged, relay 20 is energized to close its contact 23. The resistor 22 limits the current to a value sufficient to energize the relay, and prevents substantial drain of energy from the capacitors.

The relatively low A.-C. voltage of circuit 5 is rectified by a full-wave selenium rectifier 24 to supply a low D.-C. voltage between conductors 25 and 26 which constitute a low D.-C. voltage supply circuit. A relay 27 has its coil 28 included in an energizing circuit which extends from conductor 26 through manual start switch 29, normally closed contact 30 of relay 31, and through the contact 23 of relay 20 to conductor 25. The normally closed contact 32 of relay 27 is included in an energizing circuit for the brake winding 2. The energizing circuit for the clutch winding 3 extends through rheostat 33, normally open contact 34 of relay 27, and through normally closed contact 35 of relay 31. The adjustment of rheostat 33 determines the current supplied to the clutch.

Relay 31 has its coil 36 included in an energizing circuit which extends from the left side of supply circuit 6 through rheostat 37 and through normally open contact 38 of relay 27 to the right side of supply circuit 6. One or more switches 39 are connected across the coil 36 of relay 31 so as to normally short circuit the same. In the illustration, three parallel switches are shown for control of a loom, it being assumed that two of these switches are shuttle box switches and the third switch is a crank shaft switch. In normal operation, all three switches are never open at the same time, but in the event of improper operation they all open to cause energization of relay 31 and thus effect automatic quick stoppage of the machine 1 as hereinafter described. While the illustration applies to control of a loom, the invention contemplates control of any machine, and the switch or switches for controlling energization of relay 31 may detect any improper condition.

Normally open contact 40 of relay 31 serves to control energization of the coil 41 of relay 16, which is energized from conductors 25 and 26.

Normally open contacts 42 and 43 of relay 31 are included in a discharge circuit or loop with the brake winding 2. This discharge circuit or loop extends from point 18 through contact 42, through the brake winding, and through contact 43 to point 19. Thus, when contacts 42 and 43 are closed, the energy stored in capacitors 13 and 14 is discharged into the brake winding. The polarity of the high D. C. voltage across points 18 and 19 is the same as the polarity of the low D. C. voltage across conductors 25 and 26, i. e. it is such as to cause build up of the flux in the brake magnet.

Prior to operation, with the main supply circuit 6 connected to an A. C. source, the capacitors 13 and 14 are charged, and relay 20 is energized by the voltage appearing across points 18 and 19 so that the relay contact 23 is closed. At least one of the switches 39 is normally closed, and the manual start switch 29 is open. Therefore, relays 16, 27 and 31 are all deenergized.

Momentary closure of the manual switch 29 energizes relay 27 which locks itself in through its contact 44 and stop switch 45. Upon energization of relay 27, contact 32 opens the energizing circuit of the brake winding 2, and contact 34 closes the energizing circuit of the electromagnetic clutch winding 3. With the brake deenergized, and with the clutch energized from the low D. C. voltage conductors 25 and 26, the machine starts. Contact 38 of relay 27 is now closed, but relay 31 is not energized because its winding is short circuited, by at least one of the switches 39.

During normal operation, the starting and stopping of the machine is under control of the manual switches 29 and 45. Opening of stop switch 45 causes deenergization of relay 27, with consequent deenergization of the electromagnetic clutch and energization of the electromagnetic brake. Thus, during normal operation, the brake and clutch are selectively energized from the low D. C. voltage supply conductors 25 and 26, and there is no discharge of the capacitors 13 and 14.

Suppose now that the machine is in operation, relay 27 being energized, and that all of the switches 39 open due to a condition of the machine which calls for quick stoppage to prevent deleterious results such as defective goods or breakage of machine parts. Opening of all of the switches 39 causes energization of the relay 31 from the low A. C. voltage supply line 6. The opening of contact 35 of relay 31 opens the energizing circuit of the clutch winding 3. The closing of contacts 42 and 43 of relay 31 causes discharge of the stored energy from capacitors 13 and 14 into the brake winding 2 as hereinbefore described. Simultaneously, the closing of contact 40 of relay 31 energizes relay 16 which opens its contact 15 and thereby opens the charging circuit for the capacitors 13 and 14. Also, simultaneously the opening of contact 30 of relay 31 opens the energizing circuit of relay 27. Due to the time required for drop out of relay 27, the stored energy of capacitors 13 and 14 is discharged into the brake winding 2 before the opening of contact 38 deenergizes relay 31 and before the closure of contact 32 applies low D. C. voltage to the brake.

The discharge of stored energy into the winding of the brake quickly builds up the magnetic flux therein, and immediately following such discharge the contacts 32 of relay 27 close to apply low D. C. voltage to the brake from supply conductors 25 and 26, thus maintaining energization of the brake. Thus the brake is first subjected to momentary intense energization by the discharge of the capacitors to cause rapid build up of the magnetic flux in the brake magnet, and then sufficient energization of the brake is continued from the low D. C. voltage conductors 25 and 26 to maintain the built up magnetic field. If necessary, a capacitor 46 may be connected across the coil 28 of relay 27 to delay drop out thereof and to insure full discharge of capacitors 13 and 14 into the brake before low D. C. voltage is applied to the brake.

The drop out of relay 31 due to opening of contact 38 causes disconnection of the capacitors 13 and 14 from the brake and also causes deenergization of relay 16. The capacitors are then recharged and are ready for any subsequent quick stoppage.

The purpose of relay 20 is to detect the high voltage across points 18 and 19, and to prevent starting of the machine unless such high voltage exists so as to be ready for emergency quick stoppage. Unless relay 20 is energized, relay 27 cannot be energized to start the machine because the contact 23 of relay 20 is included in the energizing circuit of relay 27.

If desired provision may be made for effecting relatively slow stoppage of the machine in response to conditions which do not require quick stoppage. For this purpose, relay 47 may be provided whose normally closed contact 48 is included in the energizing circuit of relay 27. The coil 49 of relay 47 is energized from the low D. C. voltage conductors 25 and 26 whenever any one of switches 50 closes. In the case of a loom, the switches 50 may be the stop motion switches of the loom.

From the foregoing description, it will be seen that the invention provides a system wherein normal stoppage of the controlled machine is effected by energizing the brake from a low D. C. voltage circuit, and quick stoppage is effected by discharging stored energy into the brake and then applying the low D. C. voltage. Moreover, in the preferred embodiment illustrated, the interconnected relays 27 and 31 operate in sequence, during quick stoppage, to effect the desired operation.

While a preferred embodiment of the invention has been illustrated and described, the invention is not limited to such embodiment but contemplates such modifications and other embodiments as may occur to those skilled in the art.

We claim:

1. In a system for control of a machine equipped with an electromagnetically energized brake and an electromagnetically energized clutch having respective windings, a low D. C. voltage supply circuit, means normally manually operable for selectively operating the brake and clutch windings from said circuit, at least one capacitor, means for storing energy in said capacitor at relatively high voltage, a relay adapted to be energized by a low A. C. voltage, said relay being connectible to said capacitor and to said brake windings, means responsive to an improper condition of said machine for energizing said relay to thereby discharge the stored energy from said capacitor into the brake winding, and means for effecting energization of the brake winding from said low voltage circuit following the discharge of the stored energy into the brake winding.

2. In a system for control of a machine equipped with an electromagnetically energized brake and an electromagnetically energized clutch having respective windings, a low D. C. voltage supply circuit, means normally manually controllable for selectively connecting the brake and clutch windings to said circuit, at least one capacitor, means for storing energy in said capacitor at relatively high voltage, a low A. C. voltage supply circuit, a relay connected to be energized from the latter circuit, switch means for effecting energization of said relay when an improper condition of said machine occurs, contacts on said relay for connecting said capacitor to said brake winding to discharge the stored energy into the brake winding, and contacts on said relay for effecting energization of said brake winding from said D. C. supply circuit through said first means following the discharge of stored energy into the brake winding.

3. A system according to claim 2, wherein said switch means is in shunt with the winding of said relay.

4. In a system for control of a machine equipped with an electromagnetically energized brake and an electromagnetically energized clutch having respective windings, a low D. C. voltage supply circuit, a first relay energizable from said circuit, connections controlled by said relay for connecting the brake winding to said circuit when the delay is deenergized, and for connecting the clutch winding to said circuit when the relay is energized, a manual switch for controlling said relay, at least one capacitor, means for storing energy in said capacitor at relatively high voltage, a low A. C. voltage supply circuit, a second relay connected to be energized from the latter circuit, switch means for effecting energization of said second relay when an improper condition of said machine occurs, contacts on said second relay for connecting said capacitor to said brake winding to discharge the stored energy into the brake winding, and contacts on said second relay for effecting deenergization of said first relay to effect energization of said brake winding from said D. C. supply circuit following the discharge of stored energy into the brake winding.

5. In a system for control of a machine equipped with an electromagnetically energized brake and an electromagnetically energized clutch having respective windings, a low D. C. voltage supply circuit, means normally manually controllable for selectively connecting the brake and clutch winding to said circuit, at least one capacitor, a charging circuit for storing energy in said capacitor at relatively high voltage, a low A. C. voltage supply circuit, a relay connected to be energized from the latter circuit, switch means for effecting energization of said relay when an improper condition of said machine occurs, contacts on said relay for connecting said capacitor to said brake winding to discharge the stored energy into the brake winding, means for interrupting said charging circuit during the discharge of said capacitor, and contacts on said relay for effecting energization of said brake winding from said D. C. supply circuit through said first means following the discharge of stored energy into the brake winding.

6. A system according to claim 5, wherein said switch means is in shunt with the winding of said relay.

7. In a system for control of a machine equipped with an electromagnetically energized brake and an electromagnetically energized clutch having respective windings, a low D. C. voltage supply circuit, a first relay energizable from said circuit, connections controlled by said relay for connecting the brake winding to said circuit when the relay is deenergized, and for connecting the clutch winding to said circuit when the relay is energized, a manual switch for controlling said relay, at least one capacitor, a charging circuit for storing energy in said capacitor at relatively high voltage, a low A. C. voltage supply circuit, a second relay connected to be energized from the latter circuit, switch means for effecting energization of said second relay when an improper condition of said machine occurs, contacts on said second relay for connecting said capacitor to said brake winding to discharge the stored energy into the brake winding, means for interrupting said charging circuit during discharge of said capacitor, and contacts on said second relay for effecting deenergization of said first relay to effect energization of said brake winding from said D. C. supply circuit following the discharge of stored energy into the brake winding.

References Cited in the file of this patent
UNITED STATES PATENTS

| | | |
|---|---|---|
| 2,649,944 | Meyers | Aug. 25, 1953 |
| 2,728,878 | Sperr | Dec. 27, 1955 |